US005605247A

United States Patent [19]

Earnshaw

[11] Patent Number: 5,605,247

[45] Date of Patent: Feb. 25, 1997

[54] MAT WITH REMOVABLE RECEPTACLE

[75] Inventor: Shannon Earnshaw, Glen Morris, Canada

[73] Assignee: Tidy Tot Inc., Glen Morris, Canada

[21] Appl. No.: 536,910

[22] Filed: Sep. 29, 1995

[51] Int. Cl.⁶ ........ F16N 31/00

[52] U.S. Cl. ........ 220/571

[58] Field of Search ........ 220/571, 571.1, 220/729, 730, 731

[56] References Cited

U.S. PATENT DOCUMENTS

| | | | |
|---|---|---|---|
| 2,684,110 | 7/1954 | Stone . | |
| 2,936,926 | 5/1960 | Miller | 220/571 |
| 4,041,964 | 8/1977 | Shamoon . | |
| 4,122,780 | 10/1978 | Brickman . | |
| 4,280,729 | 7/1981 | Morawski . | |
| 4,415,620 | 11/1983 | Yamazaki et al. . | |
| 4,574,977 | 3/1986 | Ellis et al. | 220/571 X |
| 4,603,642 | 8/1986 | Brickman . | |
| 4,765,670 | 8/1988 | Jackson . | |
| 4,798,413 | 1/1989 | Capelli . | |
| 4,852,759 | 8/1989 | Williams et al. | 220/571.1 |
| 4,907,539 | 3/1990 | Abulhasan . | |
| 5,021,277 | 6/1991 | Fan . | |
| 5,154,961 | 10/1992 | Reuben . | |
| 5,297,309 | 3/1994 | Rotoli . | |

FOREIGN PATENT DOCUMENTS

| | | | |
|---|---|---|---|
| 1173209 | 8/1984 | Canada . | |
| 477737 | 2/1938 | United Kingdom . | |
| 877344 | 9/1961 | United Kingdom | 220/729 |

OTHER PUBLICATIONS

Canadian Industrial Design Registration No. 54714 to Les Entreprises Gincar Inc., Montreal dated Jul. 2, 1985.
Canadian Industrial Design Registration No. 54715 to Les Entreprises Gincar Inc., Montreal dated Jul. 2, 1985.

*Primary Examiner*—Steven M. Pollard
*Attorney, Agent, or Firm*—John R. Rudolph; Arne I. Fors; Jeffrey T. Imai

[57] ABSTRACT

The mat of the present invention has a flexible sheet having a raised peripheral rim and a central opening. A first receptacle has a periphery about an upwardly extending opening which is joined about the central opening. A removable receptacle is disposed in and removable from the first receptacle. The flexible sheet is foldable for storage within the first receptacle. The first receptacle may be closed by the removable receptacle. The removable receptacle enables the solid matter and liquids collecting on the flexible sheet to be carried away for disposal.

13 Claims, 6 Drawing Sheets

MAT WITH REMOVABLE RECEPTACLE

FIELD OF INVENTION

This invention relates to a mat. In particular, this invention relates to a mat having a removable receptacle within the mat to collect solid matter and liquids such as food and drink for disposal.

BACKGROUND OF THE INVENTION

Various types of mats are well known. Mats are used indoors and outdoors to collect dirt and liquids and, therefore, to protect the flooring of the building. "Welcome" mats are commonly used in houses and businesses to collect dirt from visitor's shoes. Such mats usually have a number of bristles depending upwardly from a base to remove dirt from the bottom of the visitor's footwear. The denseness of the bristles in combination with the base of the mat allows the mat to retain dirt and liquids.

Mats are also commonly used in cars. Car mats have become very sophisticated in collecting fluid. For example, U.S. Pat. No. 4,765,670 which issued Aug. 23, 1988 to Jackson, discloses a floor mat which has sloping grooves or troughs. Liquid flows through the grooves and is collected in a trough at one end of the mat and then deposited into a storage tank. The storage tank may then be removed from the mat, emptied and then replaced for re-use.

Mats are often used for special purposes. U.S. Pat. No. 4,907,539 which issued Mar. 13, 1990 to Abulhasan, discloses a pet food bowl and mat. A bowl is positioned in the centre of the mat for holding food for the pet. The mat catches spillage and overflow from the bowl. This mat, however, does not allow for easy disposal of the spillage on the mat. The spillage must be wiped to clean the mat or the entire mat must be carried to a garbage or sink for disposal of the spillage. The bowl itself serves only to dispense food or water.

The mats of the prior art do not allow for simple collection and disposal of solid matter in addition to liquids and for convenient storage of the mat.

SUMMARY OF THE INVENTION

The disadvantages of the prior art may be overcome by providing a mat which has a flexible sheet with a peripheral rim to retain solid matter and liquids spilled thereon and a receptacle for collecting the solid matter and liquids, which receptacle is removable for disposal of the collected solid matter and liquids.

In its broad aspect, the mat of the present invention comprises a flexible sheet having a raised peripheral rim and a central opening. A base receptacle has a periphery about an upwardly extending opening which is joined about the central opening of the flexible sheet. A removable receptacle is nestable in and removable from the base receptacle. The base receptacle may be closed by the removable receptacle. The removable receptacle receives the spilled solid matter and liquids. The flexible sheet is manipulated to channel the solid and liquids into the removable receptacle. The removable receptacle can be transported for disposal of the solids and liquids, permitting easy clean ups. The flexible sheet is foldable within the base receptacle for storage.

In another aspect of the invention, there is provided a mat having a retaining ring for joining the central opening in the flexible sheet about the periphery of the base receptacle. The retaining ring is circular and has an upper flange and a wall having a plurality of inwardly extending bottom protrusions circumferentially spaced thereabout. The protrusions attach the retaining ring to the base receptacle by attaching to an edge on the exterior of the base receptacle, while the upper flange of the ring rests on the periphery of the base receptacle.

In another aspect of the invention, there is provided a mat having a base receptacle, which has a plurality of ribs disposed about an interior thereof. The ribs present a plurality of gaps to allow air to pass by a removable receptacle as it is being nested in or removed from the base receptacle.

In another aspect of the invention, there is provided a mat having a removable receptacle which has handles on it to allow it to be easily grasped for removal from the base receptacle.

BRIEF DESCRIPTION OF THE DRAWINGS

The present invention will now be described with reference to the accompanying drawings, in which.

DETAILED DESCRIPTION OF THE PREFERRED EMBODIMENT

Figure 1:
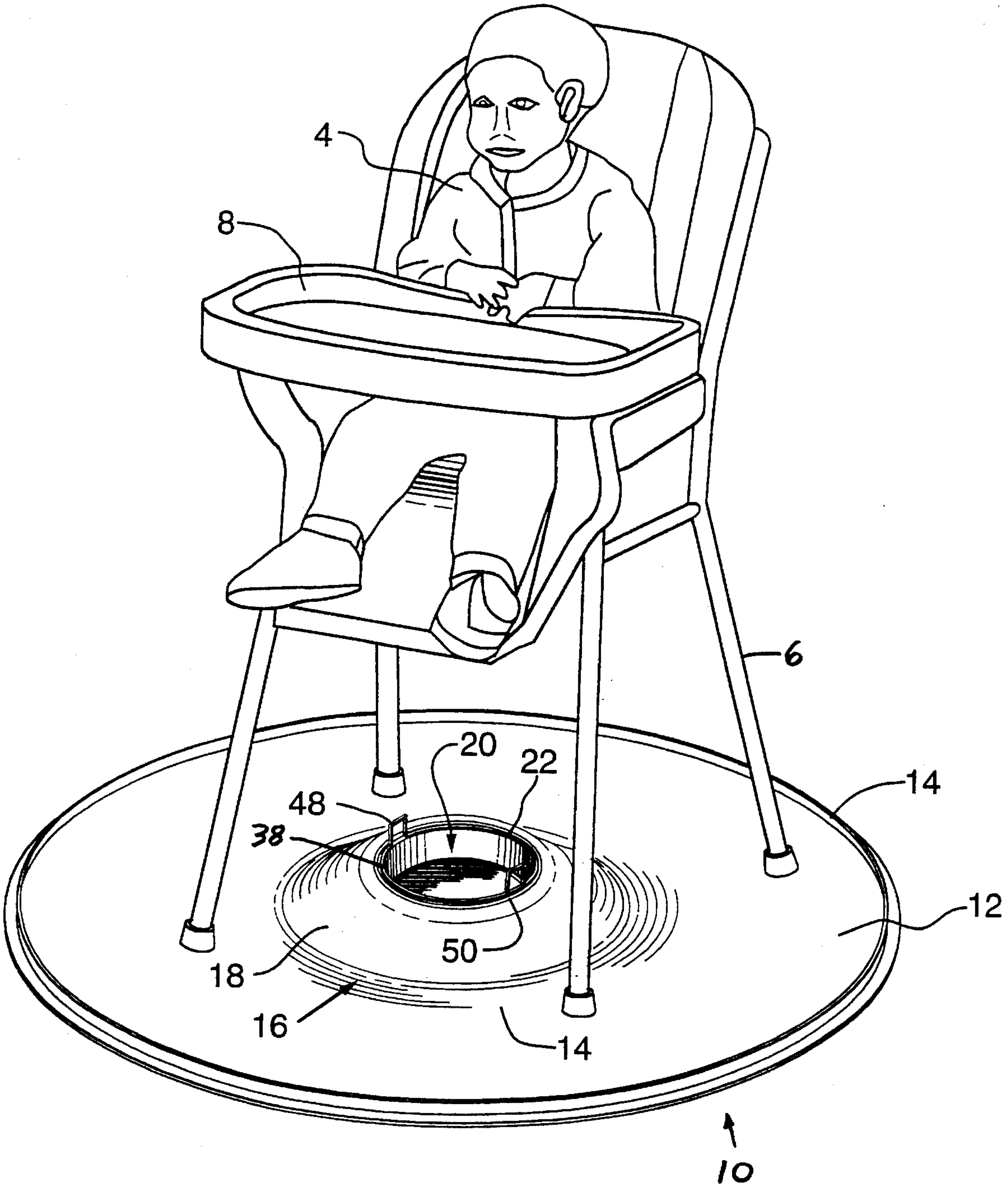
FIG. 1 is a perspective view of an embodiment of the mat of the present invention situated under a child in a highchair.

Referring to FIG. 1, a child 4 in a highchair 6 is disposed on the mat 10 of the present invention. The highchair 6 includes a tray 8 depending forwardly from the highchair 6.

The mat 10 is a generally circular shape. The mat 10 comprises a flexible sheet 12, a raised annular rim 14 extending about the perimeter of the flexible sheet 12, a base receptacle 22, a removable receptacle 38 and a retaining ring 50.

The flexible sheet 12 has a central portion 16 which has a contoured exterior 18 as a result of central opening 20 being detachably connected to a rigid base receptacle 22 about its periphery thereof. The flexible sheet 12 is affixed to the base receptacle 22 as explained below.

Figure 2:
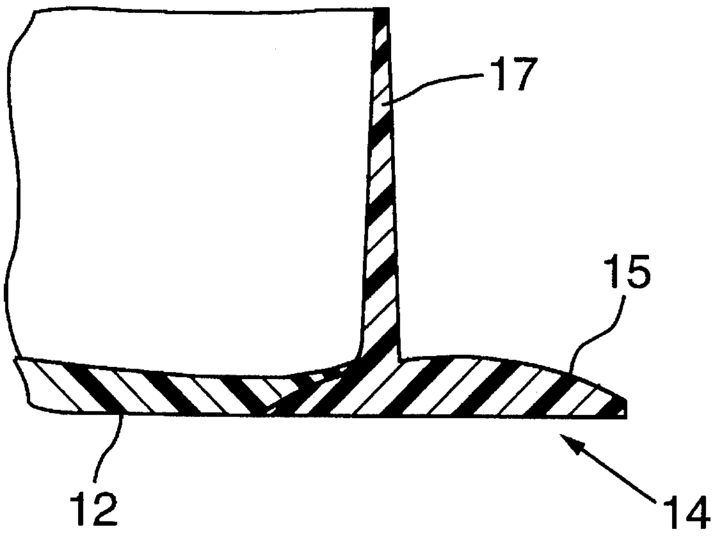
FIG. 2 is a fragmentary cross-sectional view of the flexible sheet and annular rim of the mat of FIG. 1.

Referring to FIG. 2, the annular rim 14 is preferably integral with flexible sheet 12. Annular rim 14 has an inverted T-shape comprising a base flange 15 and an upwardly extending lip 17. The flange 15 of the annular rim 14 may also be disposed on top of the flexible sheet 12.

Figure 3:
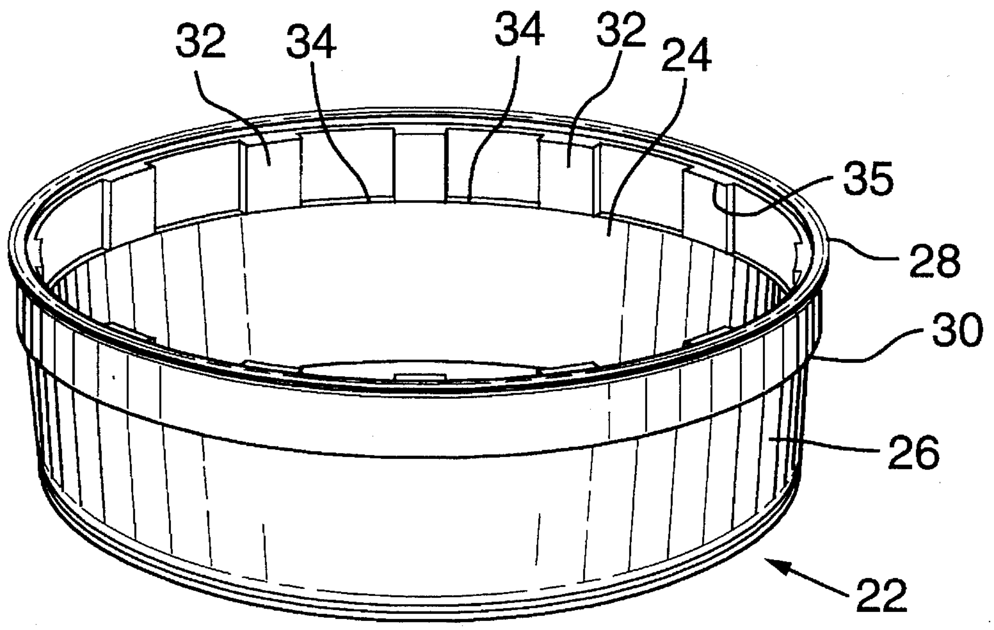
FIG. 3 is a perspective view of the base receptacle of the mat of FIG. 1.
Figure 4:
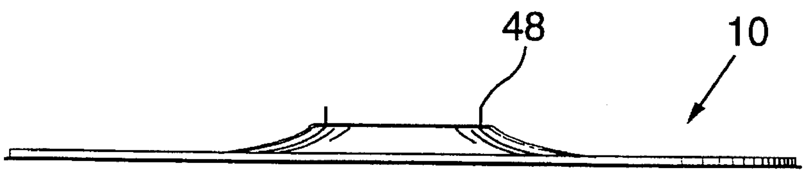
FIG. 4 is a side elevational view of the mat of FIG. 1.

Referring to FIG. 3, the base receptacle 22 is cylindrical with one closed end and one open end. The base receptacle 22 has an interior wall face 24, an exterior wall face 26 and an upper rim 28. The upper rim 28 has an outwardly extending bead. The upper portion of the base receptacle 22 has an enlarged diameter defining an inner ledge 34 about interior wall 24 and an outer edge 30 (FIGS. 3, 7 and 8) about the exterior wall 26.

Ribs 32 are circumferentially spaced about inner annular ledge 34. The ribs 32 are generally rectangular and extend from ledge 34 to the upper rim 28. The ribs 32 are approximately the same thickness as the ledge 34 to make the ribs 32 flush with the interior 24 of the base receptacle 22 to maintain a smooth interior surface. The upper edges 35 of the ribs 32 present an abutment surface on which removable receptacle rests upon when nested within base receptacle 22. The ribs 32 present a plurality of gaps to allow air to pass by removable receptacle 38 as it is being nested in or removed from the base receptacle 22. This avoids a vacuum seal which would make it more difficult to nest or remove the removable receptacle 38 from the base receptacle 22.

Figure 5:
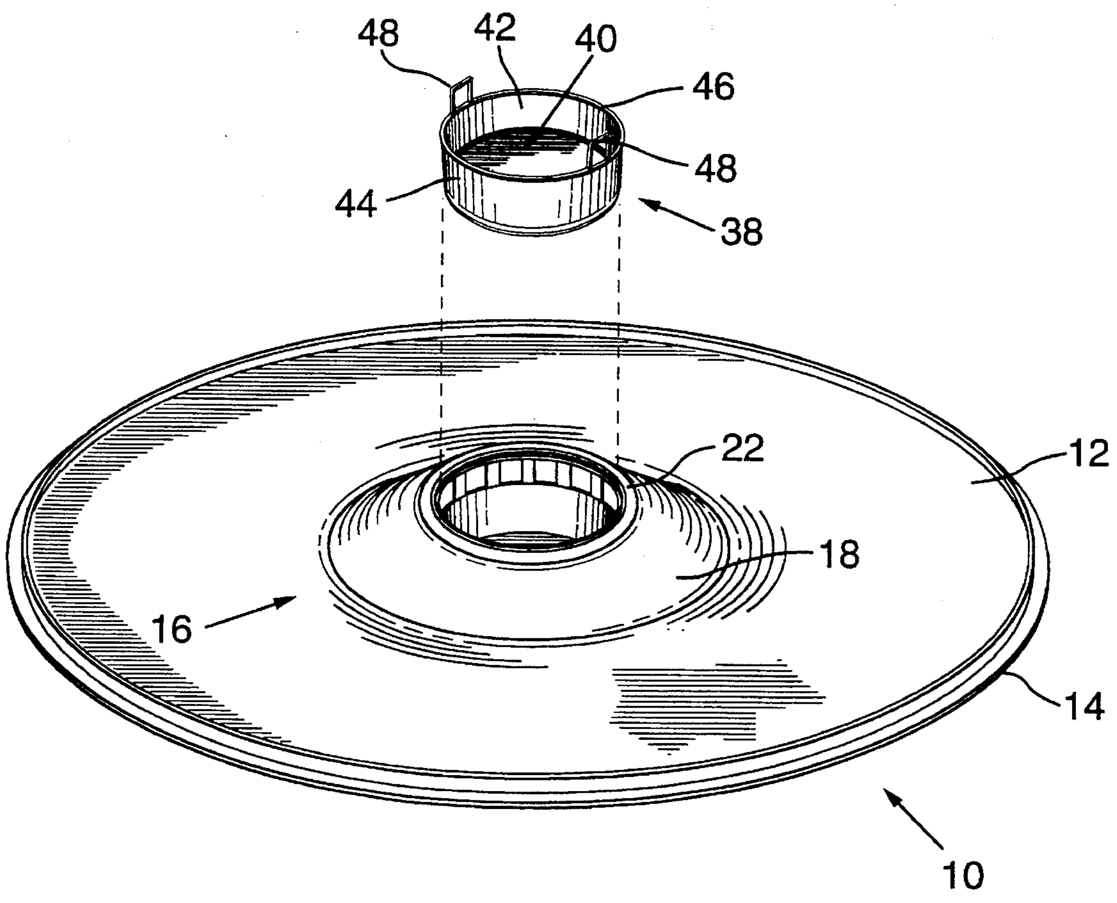
FIG. 5 is an exploded perspective view of the mat of FIG. 1 showing the removable receptacle.

Referring to FIG. 5, the removable receptacle 38 has an upper opening 40, an interior wall 42, an exterior wall 44, an upper rim 46 and handles 48. The upper rim 46 has an outwardly extending bead which is slightly larger than the bead of upper rim 28 of base receptacle 22. Handles 48 extend upwardly from the upper rim 46 to allow the user to grasp the removable receptacle 38 for removing it from the base receptacle 22 for transport.

Figure 6:
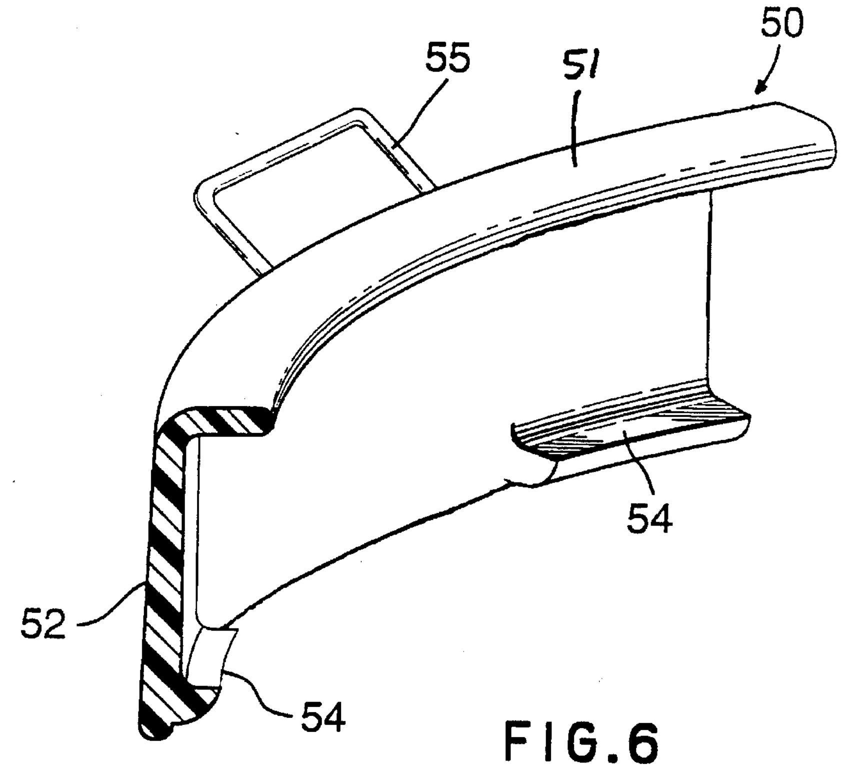
FIG. 6 is a fragmentary perspective view of the retaining ring of the mat of FIG. 1.

Referring to FIG. 6, the retaining ring 50 used to attach the flexible sheet 12 to the base receptacle 22 is illustrated. In the preferred embodiment, the retaining ring 50 is sized to correspond to the size and shape of the upper rim 28 of the base receptacle 22.

The retaining ring 50 has a top flange 51 and has a circular wall 52. The wall 52 has eight inwardly extending bottom protrusions 54 circumferentially spaced about the wall 52. The retaining ring 50 has a carrying handle 55 which depends outwardly from the retaining ring 50 in the plane of the top flange 51 of the retaining ring 50. The retaining ring 50 is preferably made of plastic.

Figure 7:
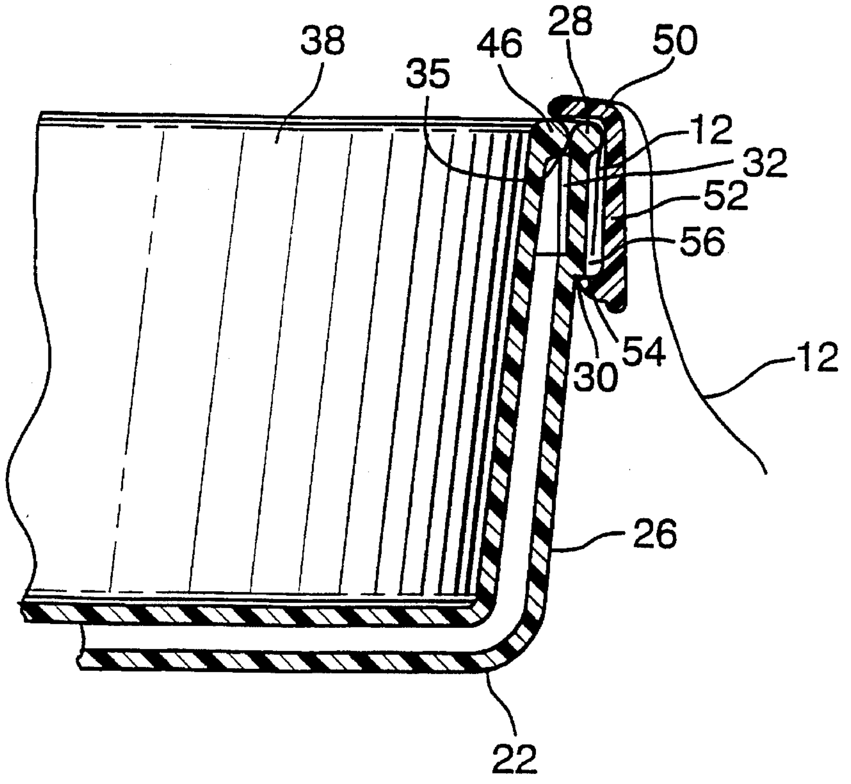
FIG. 7 is a fragmentary cross-sectional side view of the mat of FIG. 1, illustrating the removable receptacle nested within the base receptacle.
Figure 8:
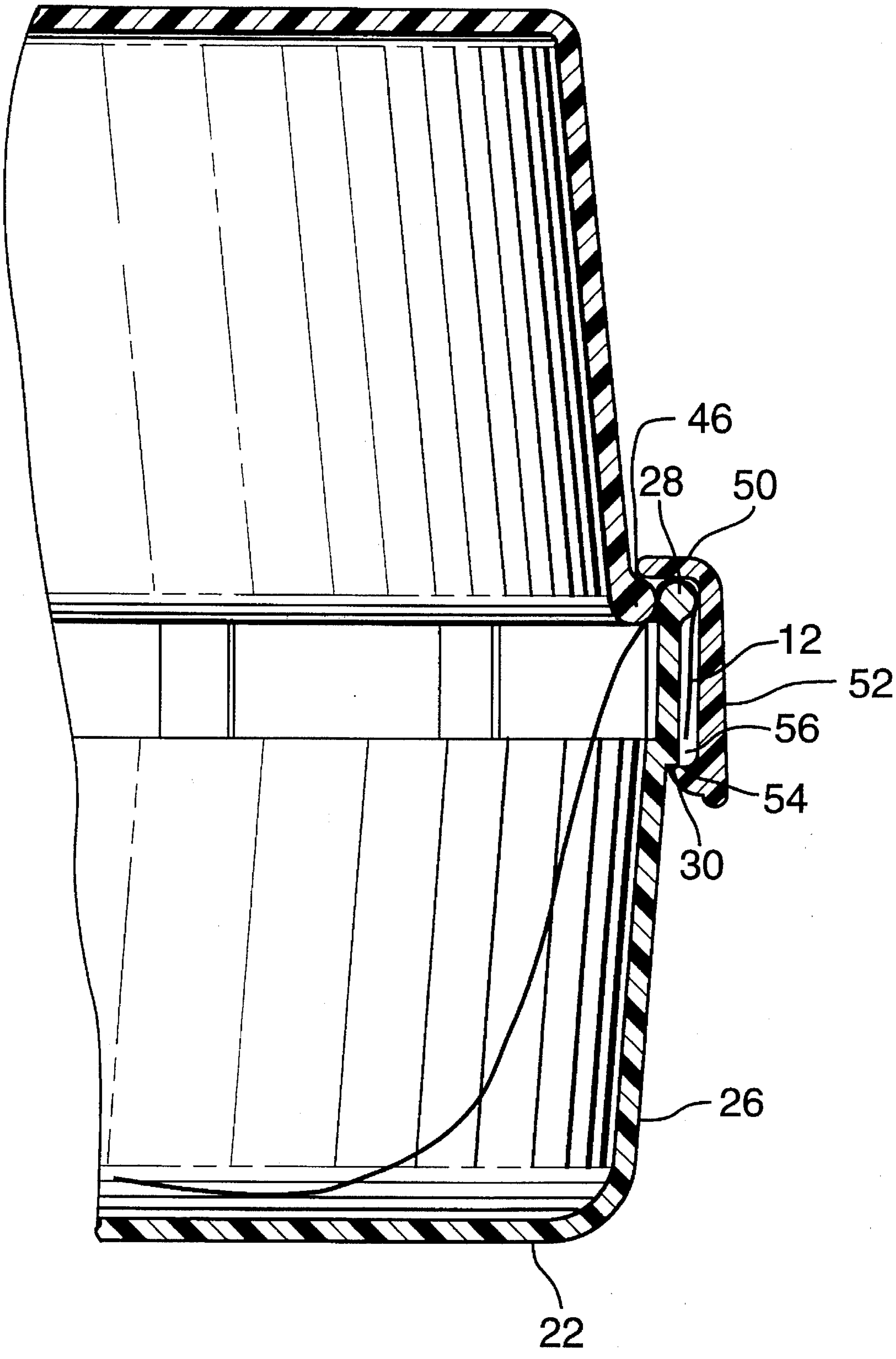
FIG. 8 is a fragmentary cross-sectional side view of the mat of FIG. 1, illustrating the removable receptacle closing the base receptacle.
Figure 9:
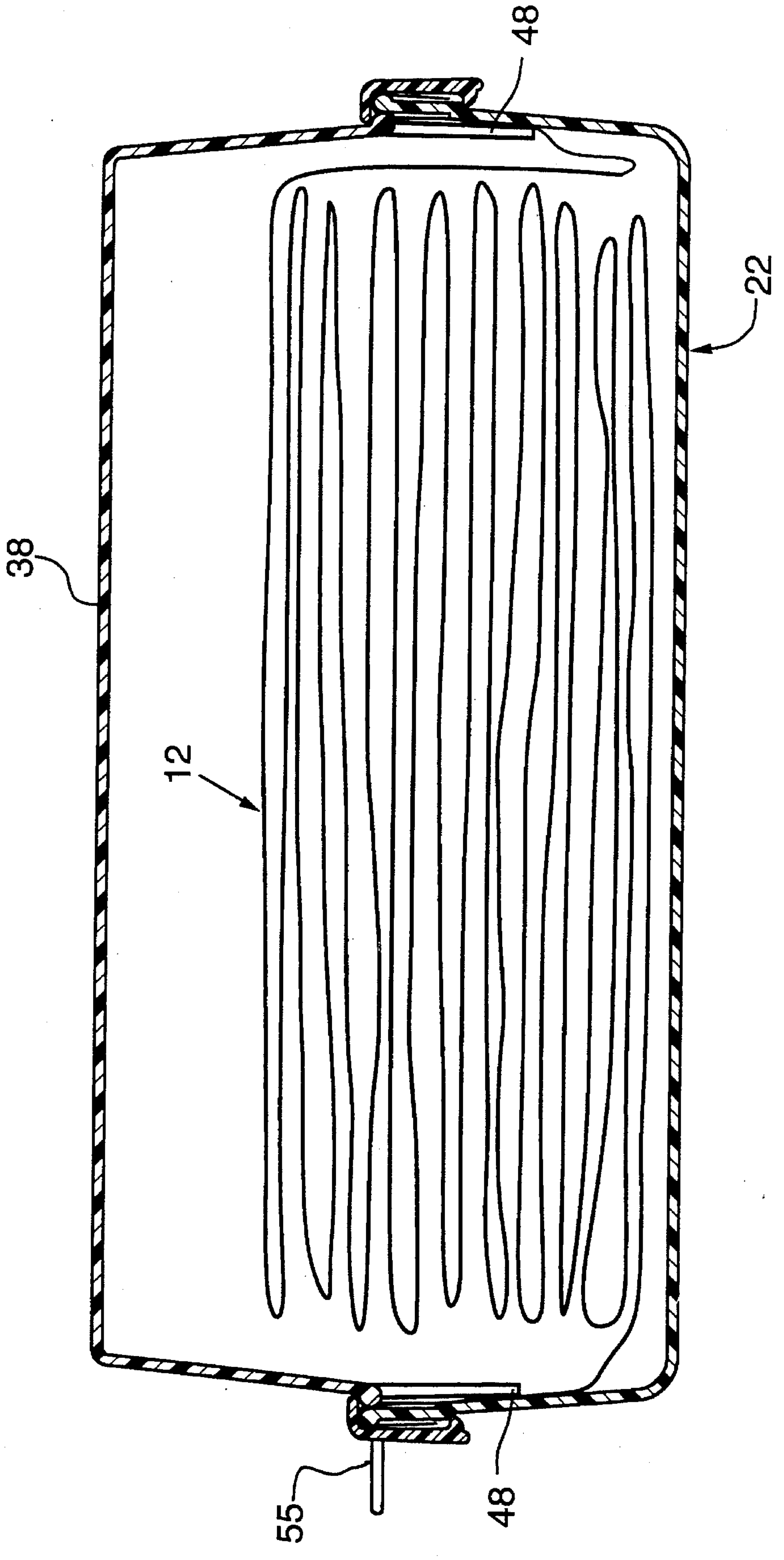
FIG. 9 is a cross-sectional side view of the mat of FIG. 1 with the flexible sheet compacted within the base receptacle and removable receptacle.

Referring to FIGS. 7, 8 and 9, the protrusions 54 are sized to engage edge 30 while the flange 51 of the retaining ring 50 rests on and extends about the upper rim 28 of the base receptacle 22. The retaining ring 50 will clamp the peripheral edge of the central opening 20 of sheet 12 to the base receptacle 22. The flexible sheet 12 then is folded over the retaining ring 50 and the carrying handle 55.

The upper rim 46 of the removable receptacle 38 rests on the ribs 32 and frictionally engages the flexible sheet 12 and the retaining ring 50. The width of retaining ring 50 is sized such that the inner circumferential edge of retaining ring 50 presents a detent to releasably retain the removable receptacle 38 nested within or closing the base receptacle 22.

It is readily understood that the mat of the present invention may be any geometric shape. Preferably for aesthetic reasons, base receptacle 22 and removable receptacle 38 should be shaped to correspond with the shape of the mat 10. Similarly, the shape of the retaining ring 50 should be shaped to correspond to the shape of the base receptacle 22.

The flexible sheet 12 is preferably made of a waterproof material to collect liquid and solid matter disposed thereon. Suitable materials include vinyl, rubber, synthetic rubber, polyvinyl chloride or polyethylene. Preferably, the flexible sheet 12 is polyvinyl chloride. The base receptacle 22 and removable receptacle 38 are preferably made of rigid plastic.

In use, a highchair 6 is placed centrally on the mat 10. Liquids and food dropped or spilled by the child 4 fall onto the flexible sheet 12 of the mat 10. The annular rim 14 retains the liquids and food on the flexible sheet 12 preventing contact with the underlying floor or carpet.

Once feeding has been completed, the child 4 and the highchair 6 can be cleaned by wiping the food off of the child 4 and the highchair 6 onto the mat 10. The highchair 6 is then removed from the mat 10. A cloth, sponge or squeegee is used to scoop or push the food and liquids on the flexible sheet 12 into the removable receptacle 38. The flexible sheet 12 can be manipulated to channel the food and liquids towards the removable receptacle 38.

Once most of the food and liquids have been directed into the removable receptacle 38, the user grasps the handles 48 and pulls up. The removable receptacle 38 snaps out of the base receptacle 22. The removable receptacle 38 is then transported to a garbage container or sink to dispose of the matter therein. The floor or carpet is therefore protected from any mess created.

The mat 10 of the present invention will catch most items thrown by the child from reaching the floor. However, it is understood that as the child grows, the throwing range increases and a larger sized mat 10 of the present invention will be required.

As shown in FIG. 9, the mat 10 may be repeatedly folded over itself to a size to fit within base receptacle 22. The removable receptacle 38 is inverted and placed over base receptacle 22 and then snap fitting the removable receptacle 38 within the base receptacle 22, conveniently storing the mat 10 for future use. The handles 48 of the removable receptacle 38 are disposed within the base receptacle 22. Carrying handle 55 allows the mat 10 to be easily transported for storage.

For future use, the steps are reversed opening the mat 10 for laying on the floor.

In another embodiment of the mat, the flexible sheet 12 could have slots for receiving the clips 52 therethrough for attaching the flexible sheet 12 about the base receptacle 22. Eight openings would be circumferentially spaced in the flexible sheet 12 about the central opening 20 for receiving the protrusions 54 of the retaining ring 50 therethrough. The retaining ring 50 is attached to the base receptacle 22 by the protrusions 54 engaging edge 30 and the flange 51 of the retaining ring 50 engaging the upper rim 28 of the base receptacle 22. The flexible sheet 12 is thereby secured about the base receptacle 22.

It will be understood, of course, that modifications can be made in the embodiments of the invention described herein without departing from the scope and purview of the invention as described by the appended claims.

I claim:

1. A mat comprising:

a flexible sheet having a raised peripheral rim and a central opening;

a base receptacle having a periphery about an upwardly extending opening, said periphery joined about said central opening;

a removable receptacle nestable in and removable from said base receptacle whereby said flexible sheet is foldable within said base receptacle for storage and said base receptacle is closeable by said removable receptacle.

2. A mat as claimed in claim 1 wherein said flexible sheet is waterproof.

3. A mat as claimed in claim 1 wherein said flexible sheet is selected from the group consisting of rubber, synthetic rubber, vinyl, polyvinyl chloride and polyethylene.

4. A mat as claimed in claim 3 wherein said annular rim is integral with said flexible sheet.

5. A mat as claimed in claim 1 wherein said base receptacle and said removable receptacle are cylindrical and said central opening is circular.

6. A mat as claimed in claim 1 additionally comprising a retaining ring for joining said central opening about said periphery.

7. A mat as claimed in claim 6 wherein said retaining ring has a circular wall and a plurality of protrusions depending therefrom.

8. A mat as claimed in claim 7 wherein said protrusions engage an exterior of said base receptacle while resting on said periphery for attaching the retaining ring to said base receptacle.

9. A mat as claimed in claim 8 wherein said protrusions are spaced about said retaining ring.

10. A mat as claimed in claim 9 wherein a portion of said flexible sheet adjacent said central opening is clamped between said retaining ring and said base receptacle for joining said central opening about said periphery.

11. A mat as claimed in claim 1 wherein said removable receptacle has at least one handle.

12. A mat as claimed in claim 6 wherein said retaining ring has at least one handle for transporting said mat when said flexible sheet is stored within said base receptacle and said base receptacle is closed by said removable receptacle.

13. A mat as claimed in claim 6 wherein said base receptacle has a plurality of ribs being disposed about an interior wall of said base receptacle.

* * * * *